O. J. SARLANDT.
DOUBLE CUTTING PLANER TOOL HOLDER.
APPLICATION FILED JULY 22, 1918.
1,319,250.
Patented Oct. 21, 1919.
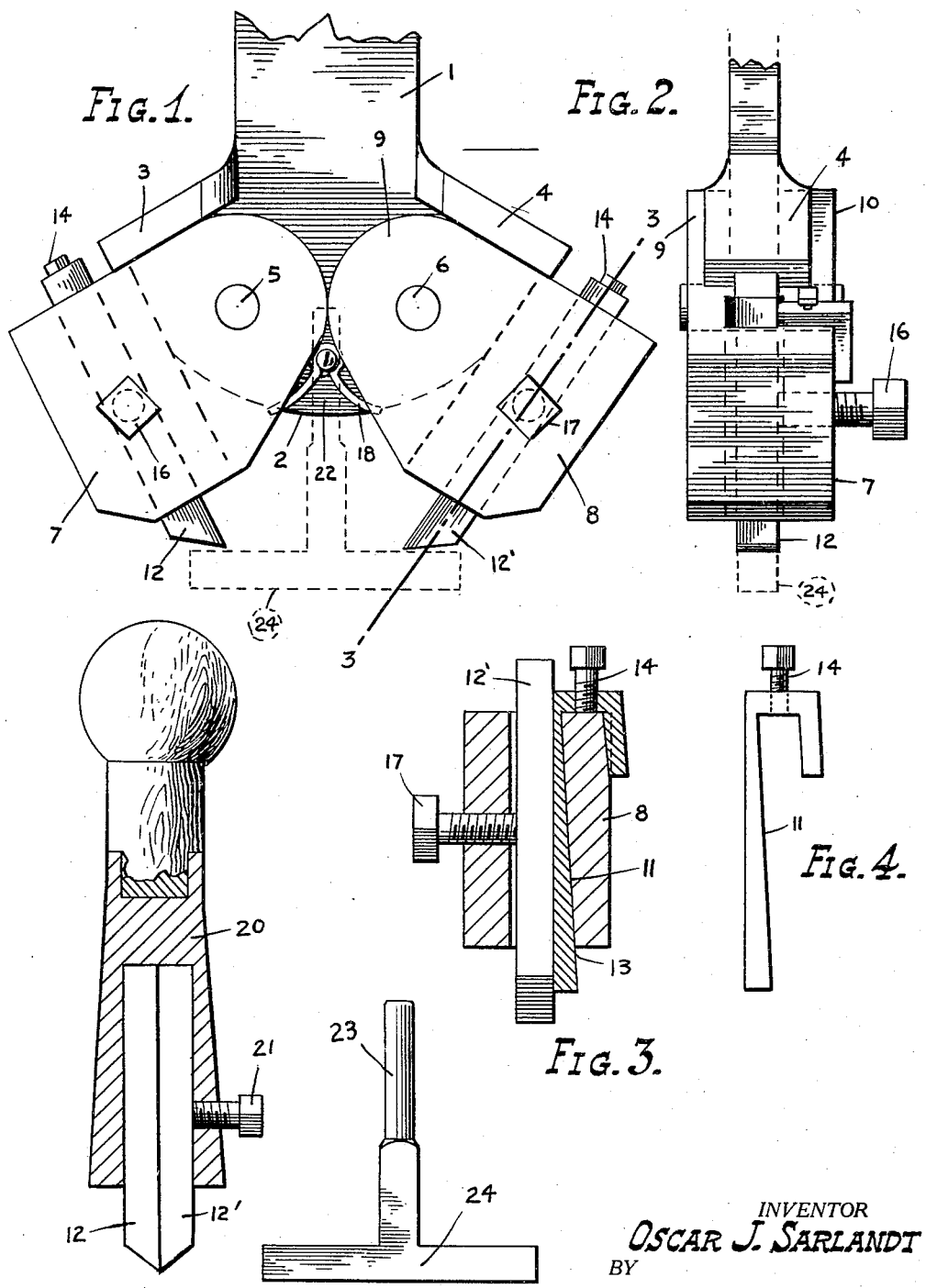
INVENTOR
OSCAR J. SARLANDT
BY
Carlos P. Griffin
ATTORNEY

UNITED STATES PATENT OFFICE.

OSCAR J. SARLANDT, OF SAN FRANCISCO, CALIFORNIA.

DOUBLE-CUTTING-PLANER-TOOL HOLDER.

1,319,250.  Specification of Letters Patent.  Patented Oct. 21, 1919.

Application filed July 22, 1918. Serial No. 246,198.

*To all whom it may concern:*

Be it known that I, OSCAR J. SARLANDT, a citizen of the United States, residing at San Francisco, in the county of San Francisco, State of California, have invented a new and useful Double-Cutting-Planer-Tool Holder, of which the following is a specification in such full and clear terms as will enable those skilled in the art to construct and use the same.

This invention relates to a double acting planer tool holder, the object of which is to permit a cut to be made in both directions of travel of the tool holder or the planer bed whichever it may be is movable.

Another object of the invention is to provide means whereby the tools may be set at the correct height, and in the correct line to properly cut the work.

Other objects of the invention will appear as the description proceeds.

An embodiment of the invention is shown in the drawings in which the same reference numeral is applied to the same portion throughout, but I am aware that there may be modifications thereof.

Figure 1 is a side elevation of the tool holder with a portion of its shank broken away to economize space, Fig. 2 is an edge elevation of the tool holder as shown in Fig. 1, Fig. 3 is a sectional view of one of the pivoted heads on the tool holder taken on line 3—3, Fig. 1 showing the manner of adjusting the transverse position of the cutter, Fig. 4 is a view of the cutter adjusting wedge separate from the tool holder, Fig. 5 is a view showing the tool sharpening holder used to bring the two cutting edges of the two tools into the same condition, and Fig. 6 is a side elevation of the square used in setting the tools in heads.

The numeral 1 represents the tool holder shank which has an extended head 2 at one end which is provided with two overhanging flanges 3 and 4. The head 2 is drilled to receive two pins 5 and 6 which carry the tool clamping heads 7 and 8. These heads are each provided with the cheek pieces 9 and 10 which extend on both sides of the head 2, and when the cutter is in operation bear on the underside of the flanges 3 and 4 respectively. The two clamping heads are each provided with an opening therethrough, the one side of which is inclined with respect to the other side, as shown at 11, the object being to have the tools 12 fit against a wedge 13, which wedge may be adjusted in height by means of the set screw 14 to move the cutting tools laterally with respect to the clamping heads, while at the same time always affording a fair and full bearing for such tools.

The cutting tools are clamped against the wedge by means of the set screws 16 and 17. The two clamping heads 7 and 8 hold tightly against the underside of the flanges 3 and 4 by means of a spring 18, and when the cut is being made by one of the tools 12 or 12', the other tool will rub against the work and the clamp head will move sufficiently to allow the tool to pass thereover when cutting, a cut being made by one tool or the other upon each stroke of the work. The tools are sharpened in a socketed holder 20 which is provided with a set screw 21 to hold the tools 12, 12' in such a position as to enable their outer ends to be identically sharpened.

In order to set the tools in the proper position for cutting, the head 2 is provided with a hole 22 which receives a pin 23 connected with a T-shaped square 24 to enable both of the cutters to be set precisely in the same position with respect to the center line of the shank on a line precisely at right angles to that line.

Having thus described my invention what I claim as new and desire to secure by Letters Patent of the United States is as follows, express reservation being made of permissible modifications:—

1. A planer tool holder comprising the combination with a shank having an extended head with laterally extending flanges of a pair of clamping heads pivotally mounted on and embracing both sides of the shank head, and normally bearing upon the underside of the flanges, a spring for holding the heads against the flanges, a tool carried by each head, a wedge carried by each head, means to adjust the position of said wedge, and means to clamp a tool against the wedge in each clamping head.

2. A planer tool comprising the combination with a shank having an extended head with laterally extending flanges, a pair of clamping heads pivotally carried by and embracing both sides of the shank head and normally bearing upon the underside of the laterally extending flanges, a spring to hold the heads against the flanges, means to clamp a tool in each head, the shank head having an opening therein to receive a square for alining the cutters.

3. A planer tool comprising the combination with a shank having an extended head and opposite pairs of lateral flanges, of a pair of clamping heads pivotally carried by the shank and embracing both sides thereof, a spring to hold said heads normally engaged with the flanges, and means to secure a cutting tool in each head.

In testimony whereof I have hereunto set my hand this 29th day of June, A. D. 1918.

OSCAR J. SARLANDT.